350-274
6/5/79

United States Patent [19]
Skolnick

[11] 4,157,223
[45] Jun. 5, 1979

[54] SLIDING REFERENCE INTERFEROMETER

[75] Inventor: Michael L. Skolnick, Calabasas, Calif.

[73] Assignee: The Perkin-Elmer Corporation, Norwalk, Conn.

[21] Appl. No.: 846,510

[22] Filed: Oct. 28, 1977

[51] Int. Cl.$^2$ .............................................. G01B 9/02
[52] U.S. Cl. .................................. 356/354; 350/274; 350/275
[58] Field of Search ............... 356/106 R, 109, 110, 356/111; 350/273, 274, 275; 250/236, 237 R, 550

[56] References Cited
PUBLICATIONS

Langenbeck, "Optical Wave-Front Mapping by Dual Interferometry" *JOSA*, vol. 58, No. 1, pp. 499–505, Apr. 1968.

*Primary Examiner*—John K. Corbin
*Assistant Examiner*—Matthew W. Koren
*Attorney, Agent, or Firm*—Salvatore A. Giarratana; Francis L. Masselle; Edwin T. Grimes

[57] ABSTRACT

An interferometer for rapidly measuring the phase profile and intensity distribution of a high powered continuous wave laser beam. The optical wave front to be measured is re-imaged on the surface of a rotating drum containing pairs of closely spaced apertures which rapidly scan the optical wave front and produce two radiation beams that interact to generate an interference fringe pattern in accordance with the principle of Young's two-slit interferometer. The interference pattern is focused on the surface of a high-speed optical chopper containing slits equal to half the width of each interference fringe pattern and the fringe radiation passing through the slits is detected by a transducer that generates an electrical sinusoidal output signal having a frequency corresponding to the chopper modulating frequency, but phase-shifted left or right by an amount corresponding to phase variations in the scanned wave front. These phase variations are measured by comparing them with a stable electrical signal having exactly the same period as the IR signal produced by chopping and detecting the output of an internally generated reference beam.

10 Claims, 5 Drawing Figures

SLIDING REFERENCE INTERFEROMETER

The Government has rights in this invention pursuant to Contract No. F29601-75-C-0044 awarded by the U.S. Air Force.

SUMMARY AND BACKGROUND OF THE INVENTION

This invention relates to optical interferometers, and particularly to a novel sliding reference interferometer that uses an adaption of Young's two-slit interference for providing a rapid and continuous measurement of the phase profiles and intensity distribution of a high power continuous wave laser beam.

A single laser beam may be considered as a large bundle of individual smaller beams each emitting radiation of substantially the same wavelength but of various intensities and of unrelated phases which may be measured by the use of an interferometer. In conventional prior art, two-beam interferometric phase measurement systems, the intensities and phases of various points in the wave front, are measured with respect to the optical phase and intensity of a preselected reference point in the wave front. In such a system, some of the measured points may be many wavelengths displaced in phase from the reference point. Furthermore, the preselected reference point may have an extremely low intensity thereby making it ineffective for both intensity and phase measurements. Thus, such a prior art system must include means for detecting phase shifts that may be separated by many wavelengths, and the preselected reference point in the wave front must have high intensity and well behaved characteristics. Such a prior art system further requires that the hardware have a very high degree of mechanical stability.

The sliding reference interferometer of the invention does not require a preselected reference point in the wave front being measured, but compares the phase and intensity characteristics of each sampled point on the wave front with those of the adjacent preceding point which, with the proper design, will not be displaced in phase as much as $\frac{1}{2}$ wavelength to avoid ambiguity. These individual measurements are phase differential and the phase is determined by summing up the individual elements from an arbitrary reference by means of an appropriate algorithm, which is programmed on a minicomputer. Software has also been developed to display phase and intensity in isometric and isocontour formats.

Briefly described, the sliding reference interferometer of the invention includes an optical system that focuses a plane, such as a laser wave front upon a rotating drum surface containing a spiral array of small aperture pairs that scan the wave front and produce an optical interference fringe pattern according to Young's two-slit interference principles. The interference fringe pattern, which would remain stationary in the absence of any phase shift between adjacent points on the wave front but which is displaced by distances proportional to phase shifts, is focused upon a second surface, which is an optical chopper having equally spaced opaque and transparent sections which alternately blocks and passes the several fringes in the interference pattern as it rotates. A condensing lens behind the chopper integrates the transmitted radiation and directs it to a detector that outputs an electrical sine wave signal at the frequency of the chopper frequency but shifting in phase according to phase variations in the scanned wave front. To measure the phase variations, this electrical sine wave signal is compared, via a high speed (200 MHZ), state of the art, phase comparator, with a second sine wave signal generated by an unscanned reference laser beam that is identically chopped to produce an unvarying signal at the same chopper frequency.

BRIEF DESCRIPTION OF THE DRAWINGS

In the drawings which illustrate a preferred embodiment of the invention.

DETAILED DESCRIPTION OF THE PREFERRED EMBODIMENT

Figure 1:
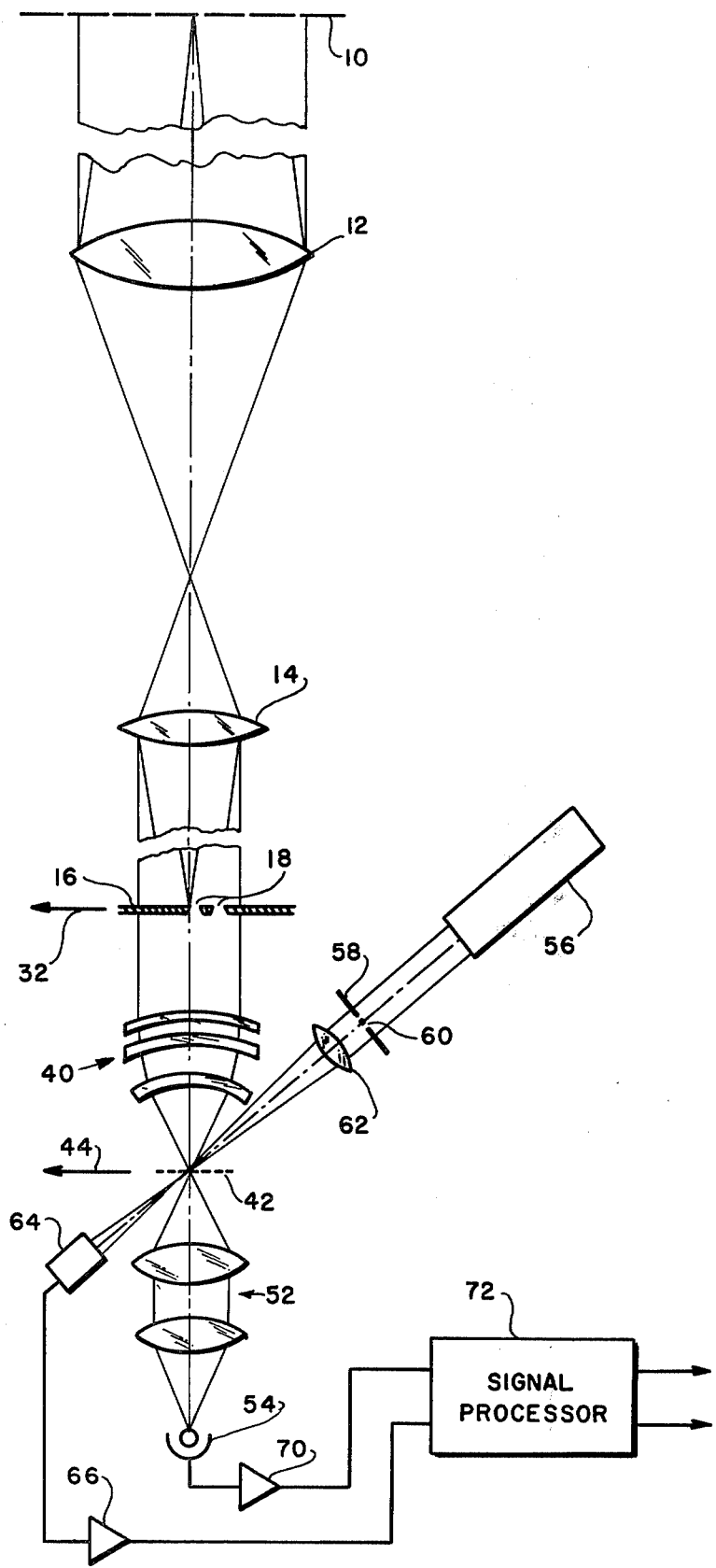
FIG. 1 is a schematic diagram illustrating the equivalent refractive optical system of the sliding reference interferometer.

FIG. 1 schematically illustrates the sliding reference interferometer positioned to scan a plane 10 in space which, for example, may be the aperture of the high energy laser having a circular or square cross-sectional configuration of ten or more centimeters. The wave front 10 of a laser is seldom, if ever, uniform and contains a great plurality of small areas that differ in both phase and intensity from adjacent areas. The sliding reference interferometer of the invention will scan across the entrance pupil 10 and will generate electrical output signals indicative of the phase variations over the scanned aperture. These phase difference signals are then transmitted to a suitable computer at the rate of 3.2 million bits per second, which then sums the phase differences relative to an arbitrarily selected reference zero, and displays phase isometrics and phase contour plots of the laser wave front 10.

Positioned on an axis normal to the laser wave front 10 is a suitable beam-forming telescope represented in FIG. 1 by the lenses 12 and 14 which are refractive equivalents of reflective off-axis parabolas. The beam-forming telescope demagnifies the laser beam from its original format to a suitable size, such as three centimeters, and re-images it on the surface of a scanner 16. The scanner 16 is an opaque rotating drum containing 32 pairs of apertures 18 that are approximately 0.5 millimeters in diameter and are spaced apart by approximately 1 millimeter. As will be subsequently described, the scanner 16 is rapidly swept across the focused wave front image and the radiation transmitted through an aperture pair 18 produces an interference pattern somewhat similar to an Airy disc pattern, as best illustrated in FIG. 2.

Figure 2:
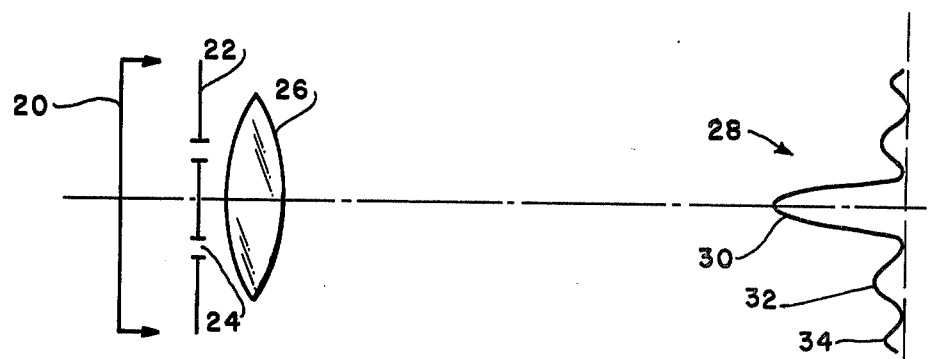
FIG. 2 is a schematic diagram illustrating the generation of a typical optical interference pattern utilized by the interferometer.

As shown in FIG. 2, the interferometer employs a variation of Young's two-slit interference principles. An optical wave front 20 parallel to an opaque member 22 containing a pair of apertures 24 may be suitably focused by an optical lens 26, not necessarily a singlet as illustrated, to produce an interference pattern 28 comprising a high intensity center lobe 30 surrounded by outer fringes 32 and 34 of diminishing intensity. The spacing between the peaks of the lobes 30 and 32 and between lobes 32 and 34 are equal and are a function of the spacing between the apertures 24, the focal length of lens 26, and the wavelength of the sampled radiation in the optical wave front 20. If the wave front 20 becomes slightly tilted and is no longer parallel with the opaque member 22, the entire interference pattern 28 will shift either up or down in FIG. 2, depending upon the direction of shift of the wave front 20.

Figure 3:
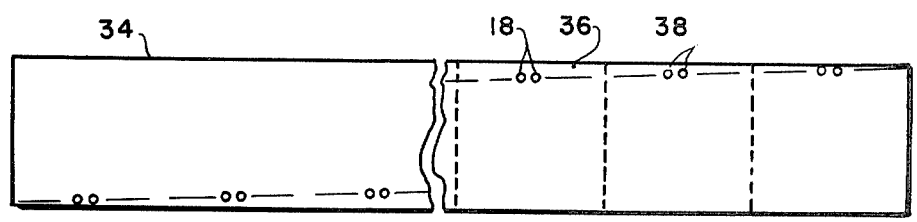
FIG. 3 is a drawing illustrating, in an expanded linear form, the surface of the circular scanning drum used in the interferometer.

The scanner 16 of FIG. 1 is rapidly scanned across the optical image in a direction parallel with the alignment of the apertures 18, as indicated by the arrow 32. The scanner 16 is preferably formed on the surface of a scanning drum containing a plurality of aperture pairs aligned in a spiral around the drum in order to scan the entire laser aperture 10 in both an x and y direction. FIG. 3 illustrates a typical scanning drum configuration in which the outer drum surface is opened to be in linear form to simplify the explanation.

As illustrated in FIG. 3, the drum surface 34 is arbitrarily divided into frames, such as the frame 36. Each frame represents, at a particular instant, an area upon which the image of the laser aperture 10 is focused, and each frame, such as frame 36, contains the aperture pairs, such as pair 18. It will be noted that as the drum surface 34 passes through the image of the laser wave front 10, the apertures 18 will make one horizontal sweep across the frame. Immediately thereafter, a second aperture pair 38 will make a similar sweep but at a different vertical level on the drum surface 34. In the preferred embodiment of the invention, the scanning drum is approximately twelve inches in diameter and is rotated at a speed of 6,000 r.p.m. to scan thirty-two vertical scan lines in each frame. The refractive beam-forming telescope illustrated in FIG. 1 is not actually used because of the requirement for operation with lasers having spectral emissions over a wide range in the infrared. Therefore, the preferred embodiment employs a reflective beam-forming telescope which re-images upon the scanner 16 the wave front plane of a high energy laser that is located approximately 13 meters from the scanner 16.

Figure 4:
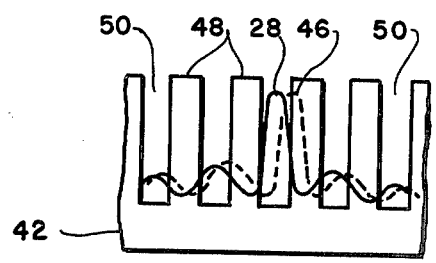
FIG. 4 is an illustration of a portion of an optical chopper used in the interferometer overlayed on the interference pattern.

The image of the laser wave front 10 that is re-imaged upon the surface of the scanner 16 produces an interference pattern which is focused by an objective lens system 40 upon the surface of an optical chopper 42 which is rapidly moved across the image of the interference pattern in a direction indicated by the arrow 44. FIG. 4 illustrates a section of the chopper 42 together with the projected image of the interference pattern 46 and a second interference pattern 28 produced by a reference HeNe laser producing an interference pattern locating the zero phase reference. The shift in these two interference patterns illustrate a typical phase shift between adjacent points being sampled in the laser wave front 10. The chopper 42 is comprised of parallel opaque sections 48 separated by transparent sections 50. Opaque and transparent sections 48 and 50 are equal in width and to half the space between the lobes in the interference pattern 28. Thus, one full chopping cycle, which corresponds to the space between corresponding edges of adjacent slots, is made equal to the space between adjacent lobe peaks in the interference pattern so that, for an idealized square wave interference pattern, all fringes in the pattern will, at particular instants, be projected through the transparent sections 50 or blocked by the opaque sections 48 of the moving chopper 42. This alternating chopping action by chopper 42 generates a corresponding alternating optical output that is projected through a relay lens module 52, which integrates all transmitted lobes and focuses the collected radiation into a detector 54. In the preferred embodiment, detector 54 is a mercury-cadmium-telluride IR detector.

In the preferred embodiment of the invention, the chopper 42 is formed by slotting the wall of a rotatable disk that is about fifteen inches in diameter and which is rotated at a rate of 24,000 r.p.m. The disk of this diameter rotated at that speed chops at a rate of approximately one million per second so that the detector 54 will generate an electrical output of approximately one MHz as it observes the interference fringe pattern 28. This frequency will be shifted in phase by the various phases detected as the scanner 16 scans over the wave front 10, and is also dependent upon speed stability of the chopper drive motor and the mechanical stability of the system.

In order to eliminate all the above-mentioned variables except those produced by phase variations in the scanned wave front, the signals produced in the detector 54 are compared with similar signals generated by a reference signal as previously indicated. The interferometer includes a low power Helium Neon reference laser 56 which projects its reference beam through a stationary shield 58 containing a pair of apertures 60 which generate an interference fringe pattern that is designed to be as similar as possible to the fringe pattern generated by the apertures in the scanner 16. The reference fringe pattern is then focused by a suitable lens 62 on the same chopper 42 that acts upon the scanned wave front 10. In order to eliminate possible errors due to variations in the chopper geometry, it is preferable that the reference beam pass through the same chopper slots as the scanned beam, and the reference beam is then transmitted to and detected by a photo multiplier element 64. Photo multiplier 64 therefore detects the identical frequency of a sinusoidal signal as sensed by the IR detector 54 except that the intensity levels from detector 54 of the scanned beam will also be recorded.

The electrical output signals from the photo multiplier 64 and the IR detector 54 are suitably amplified by amplifiers 66 and 70, respectively, and applied to a phase comparator and signal processor 72 which compares the signals to produce an output proportional to the instantaneous phase shift of the scanned laser wave front, and the instantaneous variations in intensity of the scanned wave front 10.

Figure 5:
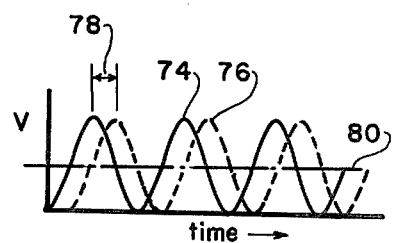
FIG. 5 is the resultant electrical waveform diagram illustrating phase shift variations measured by the interferometer of the invention.

FIG. 5 is a waveform diagram illustrating typical voltage-time signals from the amplifiers 66 and 70. It is assumed that the solid waveform 74 is generated by the photo multiplier element 64 from the reference beam produced by the laser 56, and the waveform 76 is generated by the IR detector 54 from the scanned wave front 10. The reference wave front 74 may vary because of the variations in the chopper speed or slot configurations but is unaffected by any phase variations in the scanned wave front 10. The waveform 76 is subject to the same mechanical variations as is wave front 74 and, when compared with the waveform 74, may display a phase shift 78 that is proportional to phase variations in the scanned wave front 10 only. The phase comparator and signal processor 72 readily detects the instantaneous variation by detecting the time difference between the zero crossover points of the IR and reference waveforms 80, as shown in FIG. 5. The time differences between these two signals are resolved into sufficiently small segments to realize the desired accuracy for reproducing the waveform 10.

The output of the phase comparator and signal processor 72 may, if desired, be applied to a suitable computer which may select from the accumulated data a reference point of suitable intensity to provide a zero phase. The various phase differences are then added algebraically to reconstruct the wave front profile of the laser output being interrogated.

Having thus described a preferred embodiment of my invention, what is claimed is:

1. A sliding reference interferometer for measuring intensity and phase variations between adjacent points on a plane in space, said interferometer including:
   means for re-imaging the plane on the surface of an opaque scanning element having a pair of apertures that produce an optical interference fringe pattern;
   means for producing relative parallel movement between said aperture pair and said re-imaging plane; and
   means for measuring shifts in said fringe pattern, said shifts being proportional to variations in phase between adjacent points on said plane.

2. The interferometer claimed in claim 1 wherein said fringe pattern shift measuring means includes:
   an optical chopper positioned in the image of said pattern and having alternate equally spaced opaque and transparent segments spaced to pass said fringe pattern; and
   detector means positioned to receive the chopped optical image of said pattern, the output of said detector being an alternating electrical signal having an amplitude corresponding to the intensity of said fringe pattern, a frequency corresponding to the frequency of said chopper, and phase shift variations corresponding to the optical phase variations across the scanned wave front plane.

3. The interferometer claimed in claim 2 further including:
   a reference optical system for generating an alternating electrical reference signal corresponding to the chopping frequency of said optical chopper and a zero reference phase; and
   circuitry responsive to said reference signal and to said detector means for generating output signals corresponding to the intensity and phase variations between said adjacent points on said reference plane.

4. An interferometer for generating signals indicative of phase and intensity variations between a plurality of adjacent points across a plane in space, said interferometer comprising:
   a scanning member having therein at least one pair of small closely spaced apertures which, when the first side of said member is illuminated with a substantially parallel beam of incident radiation, generates at a predetermined distance from the second side an optical interference pattern having a plurality of equally spaced fringes which are indexed from the center of the focal plane an amount proportional to the tilt of the parallel beams relative to the scanning plane;
   means for re-imaging the plane and space upon, and normal to, the surface of said first surface of said scanning member;
   an optical chopper positioned at said predetermined distance from said second side of said member and aligned to receive said optical interference pattern, said chopper having a plurality of equally spaced opaque and transparent sections, the spacing between corresponding edges in adjacent transparent sections being equal to the spacing between the peaks of said equally spaced optical interference fringes;
   transducer means positioned to detect said interference fringes through said chopper and to generate an electrical signal proportional to the intensity of said fringes;
   means for moving said optical chopper across the image of said interference pattern whereby said transducer means generates an alternating signal at a frequency corresponding to the chopping rate of said chopper; and
   means for moving said pair of apertures to scan across said re-image plane in space whereby said transducer means generates an alternating signal that is shifted in phase according to phase shifts of sampled points in said scanned plane in space.

5. The interferometer claimed in claim 4 wherein said scanning member is a rotatable drum having a plurality of said aperture pairs positioned in a spiral on said surface whereby said re-imaged plane is scanned in both x and y directions.

6. The interferometer claimed in claim 5 wherein said optical chopper is formed on the surface of a rotatable disk.

7. The interferometer claimed in claim 6 further including means for generating a reference signal precisely indicative of zero phase, said means comprising:
   a reference laser;
   an aperture pair in the beam of said reference laser, said aperture pair forming an interference fringe pattern on the surface of said chopper geometrically equivalent to that of the IR fringe pattern; and
   a photo detector positioned to receive the chopped image of said reference laser interference pattern.

8. The interferometer claimed in claim 7 further including circuitry coupled to the output of said transducer means and said photo detector for comparing the alternating signals produced by said reference signal and those produced by said transducer, said circuitry generating output signals proportional to the variations in phase and intensity of scanned adjacent points on said plane in space.

9. The interferometer claimed in claim 8 further including an objective lens system interposed on the axis between said scanning member and said optical chopper for focusing the image of said optical interference pattern upon the surface of said chopper.

10. The interferometer claimed in claim 9 further including a relay lens interposed on the axis between the said optical chopper and said transducer means for integrating the radiation passing through said chopper and focusing said radiation on said detector.

* * * * *